No. 776,150. PATENTED NOV. 29, 1904.
W. R. SMITH.
APPARATUS FOR TREATING TUBULAR FABRICS.
APPLICATION FILED AUG. 31, 1903.
NO MODEL. 2 SHEETS—SHEET 1.
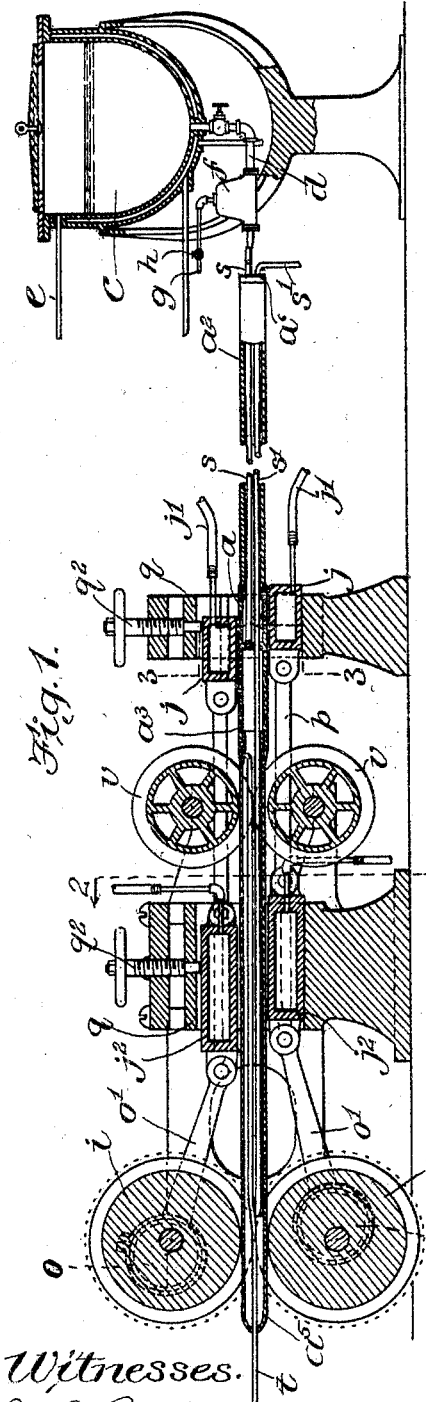
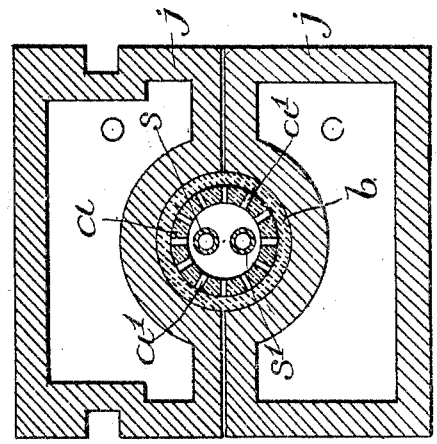
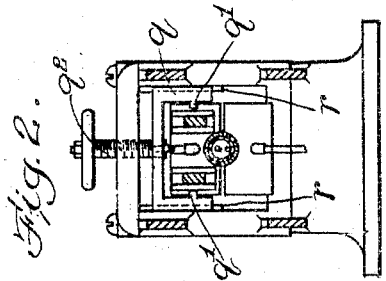

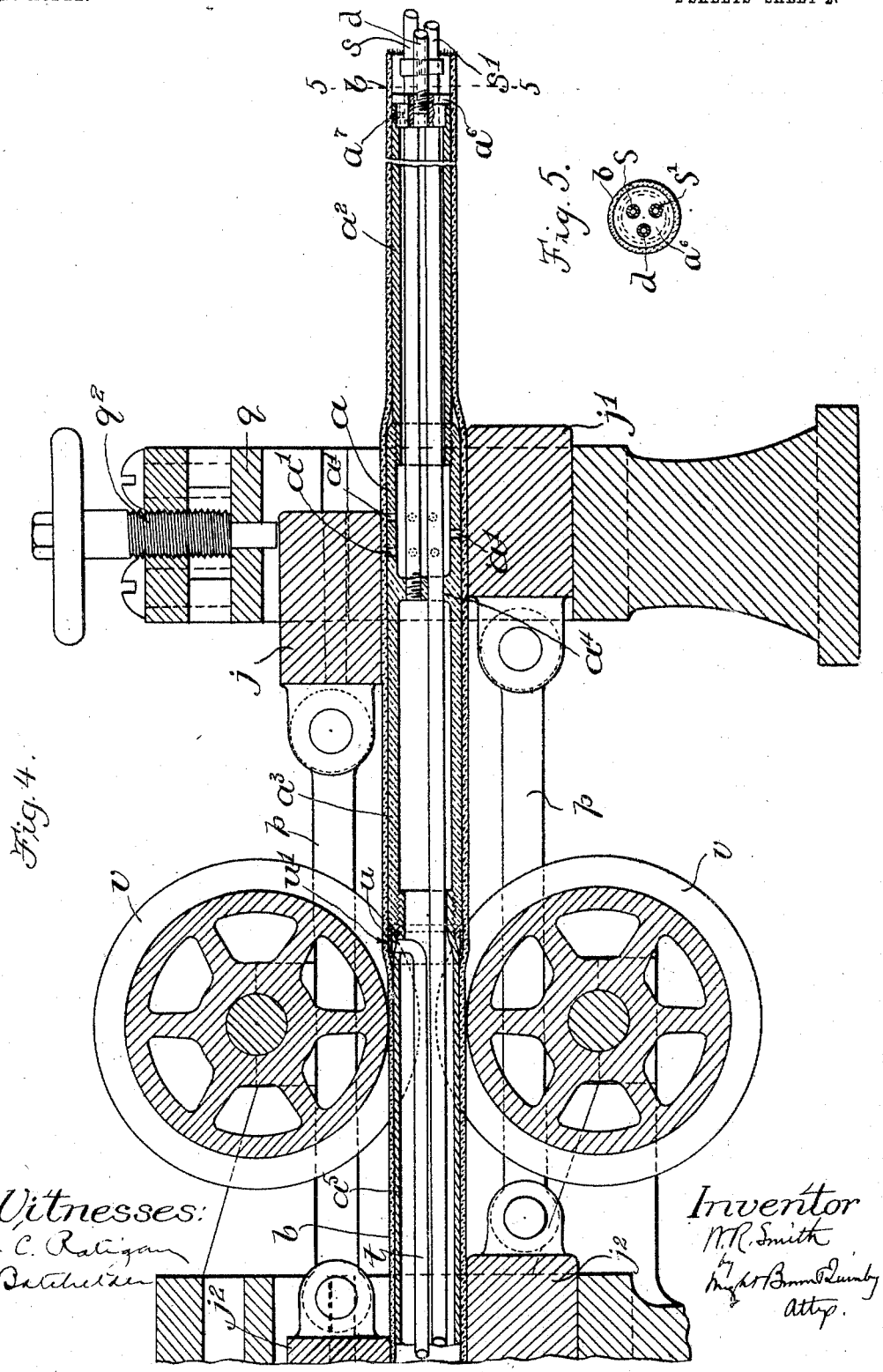

No. 776,150. Patented November 29, 1904.

UNITED STATES PATENT OFFICE.

WILLIAM R. SMITH, OF BUFFALO, NEW YORK.

APPARATUS FOR TREATING TUBULAR FABRICS.

SPECIFICATION forming part of Letters Patent No. 776,150, dated November 29, 1904.

Application filed August 31, 1903. Serial No. 171,338. (No model.)

*To all whom it may concern:*

Be it known that I, WILLIAM R. SMITH, of Buffalo, in the county of Erie and State of New York, have invented certain new and useful Improvements in Apparatus for Treating Tubular Fabrics, of which the following is a specification.

This invention has for its object to provide means for waterproofing a tubular textile fabric, such as a woven hose, by forcing into it a fluid or semifluid waterproofing composition, such as a solution of rubber.

The invention consists in the improved apparatus hereinafter described and claimed, the same comprising means for forcing the filling composition against the tubular fabric and under such pressure as to cause the composition to penetrate the fabric.

The improved apparatus also comprises means for applying pressure to the external surface of the fabric along the region penetrated by the composition, the pressure being preferably accompanied by heat.

Of the accompanying drawings, forming a part of this specification, Figure 1 represents a longitudinal section of an apparatus embodying my invention. Fig. 2 represents a section on line 2 2 of Fig. 1. Fig. 3 represents a section on line 3 3 of Fig. 1. Fig. 4 represents an enlargement of portions of Fig. 1. Fig. 5 represents a section on line 5 5 of Fig. 4.

The same reference characters indicate the same parts in all the figures.

In the drawings, $a$ represents a mandrel, formed to closely fit and internally support a tubular woven fabric $b$, the said fabric being, for example, a length of woven hose for conducting water. The mandrel is hollow and forms a part of a conduit for the filling composition, which may be a solution of rubber or any other waterproofing composition which when forced into the pores of the fabric will render the same waterproof. The mandrel is provided with means for distributing the composition outwardly to cause it to come in contact with the portion of the fabric supported by the mandrel, the preferred provision for the distribution of the composition being a number of orifices $a'$, formed in the periphery of the mandrel. Said orifices are unobstructed and are of sufficient diameter to permit a viscid composition to flow through them.

$c$ represents a reservoir for the composition, said reservoir being adapted to be heated and to withstand a degree of internal pressure sufficient to force the composition through an outlet-pipe $d$ and through the orifices of the mandrel into the fabric supported by the mandrel.

Preferably the outlet-pipe $d$ communicates with one end of an enlarged conduit $a^2$, the opposite end of which is affixed to the mandrel, the composition flowing from the pipe $d$ to the mandrel through the conduit $a^2$, which is of sufficient diameter to receive the steam-pipes $s\ s'$, hereinafter referred to. The outer end of the conduit $a^2$ may be closed to cause the composition to fill said conduit and exude from the orifices $a'$ by means of a plug $a^6$, which is detachably secured to the conduit by a screw $a^7$ or otherwise. The plug has openings in which the pipes $d$, $s$, and $s'$ are tightly fitted. The length of the conduit $a^2$ should be equal to or greater than the length of a section of tubular fabric to be treated. The pipe $d$ and the steam-pipes $s\ s'$ should be detachably connected with the conduit $a^2$, so that the fabric can be drawn upon the outer end of the said conduit.

Pressure may be exerted on the composition in the reservoir by any suitable means, such as by steam introduced through a pipe $e$, the steam-pressure serving to force the composition through the pipe $d$ and conduit $a^2$ and the mandrel $a$, causing the composition to penetrate the portion of the fabric that is in contact with the mandrel. The steam also serves to heat the composition. A dome or trap $f$ may be provided at the upper side of the outlet-pipe $d$, said dome receiving the air, water of condensation, and steam that pass into the outlet-pipe. These elements are lighter than the composition, especially when the latter is a solution of rubber, so that they accumulate in the dome, from which they may be drawn off through a waste-pipe $g$, provided with a cock $h$.

It will be seen that when a section of tubular fabric $b$ is placed upon the mandrel and the pipe $a^2$ the portion of the fabric that is in contact with the mandrel will be charged with the composition distributed by the mandrel, the pressure on the composition forcing it into and through the fabric. It will also be seen that by feeding the fabric lengthwise all parts of the length of the fabric will be subjected to contact with the mandrel and will be charged with the composition. The feeding of the fabric may be effected by a pair of feed-rolls $i\ i$, arranged at one end of the machine, said rolls being driven in the direction required to draw the charged fabric from the mandrel.

Means are employed to exert pressure on the exterior of the portion of the fabric that is in contact with the mandrel, the pressing means being opposed to the mandrel and preventing the composition from exuding from the outer surface of the fabric, besides spreading and evenly distributing the composition. The pressure-applying means are preferably reciprocating rubbing-tools or burnishers, which are preferably heated, so that the composition is rubbed into and distributed through the fabric, and is at the same time heated so that its distribution is facilitated. I prefer to employ as the pressing means two steam-heated reciprocating rubbers or burnishers $j\ j$, having grooved acting faces which are semicircular in cross-section and are formed to collectively surround the portion of the fabric that is supported by the mandrel. The burnishers may be hollow and supplied with steam through flexible pipes $j''\ j''$, connected with a source of steam-supply. The burnishers are reciprocated lengthwise of the mandrel $a$, and their length is such that they at all times substantially cover that portion of the fabric which covers the outlets $a'$ of the mandrel.

The mandrel $a$ is preferably elongated or extended rearwardly, as shown at $a^3$, from the portion in which the outlets $a'$ are formed. The diameter of the mandrel is such that the tubular fabric drawn upon it is stretched by the mandrel, so that the interstices between its threads are opened somewhat to enable the filling composition to readily penetrate the fabric. The rear portion of the mandrel is heated by steam or other heating medium introduced through the pipe $s$, which passes through the conduit $a^2$ and through a partition $a^4$ within the mandrel, said partition being between the outlets $a'$ and the extended rear portion of the mandrel and preventing the composition from entering the said rear portion. The fabric, with its filling, passes over the rear portion of the mandrel after leaving the burnishers $j\ j$ and the filling is dried or partially dried by the heat of said rear portion.

$a^5$ represents an extension of the mandrel, which is preferably of smaller diameter than the perforated or main portion, and, as here shown, is a tube affixed to the rear end of the main portion of the mandrel and preferably of somewhat smaller diameter than the latter, so that the fabric after passing from the main portion of the mandrel will slide freely along the extension. The rear or outer end of the extension is closed, so that the extension constitutes a heated drying-chamber, its inner end communicating with the interior of the main portion of the mandrel and receiving the heating medium therefrom.

$s'$ represents an exhaust or return pipe for the heating medium, said pipe extending from the outer portion of the extension through the mandrel and through the conduit $a^2$, which conducts the composition to the mandrel.

Two burnishers $j^2\ j^2$, formed like the burnishers $j$, although preferably longer, act on the fabric passing over the extension $a^5$ and coöperate with the heated surface thereof in additionally drying and finishing the filled fabric. The two pairs of burnishers are preferably operated simultaneously by means of eccentrics $o\ o$ on the shafts of the feed-rolls $i\ i$ and rods $o'\ o'$, connecting the eccentric-straps with the burnishers $j^2$, the burnishers $j^2$ being connected by rods $p$ with the burnishers $j$. The lower burnishers $j\ j^2$ move in fixed guides, while the upper burnishers move in vertically-adjustable guides $q$, having horizontal ribs $q'$ engaging horizontal grooves in the sides of the upper burnishers. The guides $q$ are supported and vertically adjusted by adjusting-screws $q^2$, which are engaged with threaded orifices in fixed parts of the frame of the machine, said frame having vertical guide-ribs $r$ (see Fig. 2) engaged with the guides $q$. Provision is thus made for varying the pressure of the burnishers on the fabric and for accommodating the burnishers to the thickness of the fabric.

To render the inner surface of the filled fabric non-adhesive, I provide means for applying a suitable preparation, preferably in liquid form, to the said inner surface at a point between the two pairs of burnishers. The said means comprise a pipe $t$, extending between the feed-rolls $i$, which are suitably grooved to accommodate it, and means (not shown) for forcing the preparation through said pipe. The pipe $t$ extends into a groove or recess $u$, formed, preferably, at the junction of the main portion of the mandrel and the extension $a^5$. The said groove may be covered by a perforated ring $u'$, through which the perforation passes to the inner surface of the fabric. The preparation may be forced into the fabric by rolls $v\ v$, having grooved peripheries formed to fit the external surface of the fabric, the rolls being journaled on bearings affixed to the frame of the machine and pressing the fabric against the extension $a^5$. The preparation may contain talc or other like material. When the fabric treated with the said preparation has been additionally dried and finished by the heated extension $a^5$ and burnishers $j$, it is stiffened and rendered non-adhesive internally.

The filling composition may be introduced into the fabric through the burnishers, the latter having chambers to receive said composition, and outlets in the walls of said chambers which form the acting faces of the burnishers. Steam-pressure may be applied to force the composition through the said outlets.

A length of tubular fabric treated in the manner and by the means above described is rendered waterproof and is therefore well adapted to conduct water.

The feeding of the fabric through the machine may be effected either wholly or in part by the rolls $v\,v$ and $i\,i$, these rolls being positively rotated. The inner surface of the fabric is kept hot by the heated main body of the mandrel and by the heated extension $a^3$. Hence the adhesion of the composition at the inner surface of the fabric to the mandrel and extension is reduced to the minimum, while the composition at the external surface of the fabric is rendered relatively cool and sticky by contact with the air, so that sufficient friction may be developed between the external surface of the fabric and the feed-rolls to enable the latter to feed the fabric. If desired, however, the fabric may be fed or drawn along by a feeding mechanism comprising a clamping device adapted to engage the forward end of the fabric and a rope or chain engaged with said clamping device and with a power-driven drum located at a distance from the rear end of the machine equal to or greater than the length of the fabric. The rotation of the drum will wind up the rope or chain and draw the fabric through the machine. The fabric may be drawn in this manner onto a metal tube formed to support the fabric internally, said tube being removable with the fabric drawn upon it to a vulcanizing apparatus, in which the filled fabric may be subjected to heat to vulcanize the filling composition, the latter being composed of a rubber solution prepared for vulcanization. The rolls $v\,v$ and $i\,i$ may have their peripheries roughened, milled, or corrugated to enable them to more effectively grasp the fabric.

I claim—

1. An apparatus of the character stated, comprising a mandrel having unobstructed liquid-distributing orifices in its periphery, and means for forcing a filling composition into the mandrel and through said orifices, the apparatus being provided with means for keeping the said composition in a heated condition while passing through said orifices.

2. An apparatus of the character stated, comprising a liquid-distributing mandrel, means for forcing a filling composition into said mandrel, and means for applying pressure to the exterior of a tubular fabric supported by the mandrel.

3. An apparatus of the character stated, comprising a liquid-distributing mandrel, means for forcing a filling composition into said mandrel, and heated pressing devices arranged to exert pressure on the exterior of a tubular fabric supported by the mandrel.

4. An apparatus of the character stated, comprising means for internally supporting a tubular fabric, means for forcing a filling composition outwardly into the supported fabric, and means for applying pressure to the exterior of the supported fabric.

5. An apparatus of the character stated, comprising means for internally supporting a tubular fabric, means for forcing a filling composition outwardly into the supported fabric, and heated pressing devices arranged to exert pressure on the exterior of the supported fabric.

6. An apparatus of the character stated, comprising means for internally supporting a tubular fabric, means for forcing a filling composition outwardly into the supported fabric, means for applying pressure to the exterior of the supported fabric, and means for moving or feeding the fabric endwise.

7. An apparatus of the character stated, comprising a reservoir to contain a filling composition, an elongated conduit communicating with the reservoir, a liquid-distributing mandrel communicating with the said conduit, means for exerting pressure on the contents of the receptacle to force the composition outwardly from the mandrel, and reciprocating heated burnishers arranged to act on the exterior of a tubular fabric supported by the mandrel.

8. An apparatus of the character stated, comprising means for internally supporting a tubular fabric, means for applying pressure to the exterior of the supported fabric, and means for forcing a filling composition into the portion of the fabric that is interposed between said supporting and pressing means.

9. An apparatus of the character stated, comprising a supporting member formed to enter a tubular fabric, and a pair of burnishers constituting a two-part tube-pressing member arranged to embrace the portion of the fabric which bears on the supporting member, one or both of said members being formed to contain a filling composition and having outlets arranged to deliver said composition to the fabric.

10. An apparatus of the character stated, comprising a mandrel having a perforated portion and an extension separated internally from the perforated portion, means for forcing a filling composition into the perforated portion, means for heating the extension, and burnishers arranged to surround the perforated portion.

11. An apparatus of the character stated, comprising a mandrel having a perforated portion and an extension separated internally from the perforated portion, means for forcing a filling composition into the perforated portion, means for heating the extension, and burnishers arranged to surround the extension.

12. An apparatus of the character stated, comprising a mandrel, having a perforated portion, an extension separated internally from the perforated portion, means for forcing a filling composition into the perforated portion, and means for presenting a non-adhesive preparation to the interior of a fabric on the extension.

13. An apparatus of the character stated, comprising a mandrel, having a perforated portion, an extension separated internally from the perforated portion, means for forcing a filling composition into the perforated portion, two sets of burnishers, one set surrounding the perforated portion and the other the extension, and means for presenting a non-adhesive preparation to the interior of the fabric at a point between the two sets of burnishers.

14. An apparatus of the character stated, comprising a mandrel, having a perforated portion, an extension separated internally from the perforated portion, means for forcing a filling composition into the perforated portion, and rolls arranged to act on the exterior of the portion of the fabric supported by the extension.

15. An apparatus of the character stated, comprising a closed receptacle for a filling composition, a hollow perforated mandrel formed to support a tubular fabric, a conduit connecting the receptacle with the mandrel, and means for exerting pressure on the composition in the receptacle to force the same into the fabric on the mandrel.

16. An apparatus of the character stated, comprising a closed receptacle for a filling composition, a hollow perforated mandrel formed to support a tubular fabric, a conduit connecting the receptacle with the mandrel, means for introducing steam into the receptacle to force the composition into the fabric, and a trap communicating with the conduit.

In testimony whereof I have affixed my signature in presence of two witnesses.

WILLIAM R. SMITH.

Witnesses:
   Geo. R. Rix,
   J. E. Voorhis.